Figure 3:
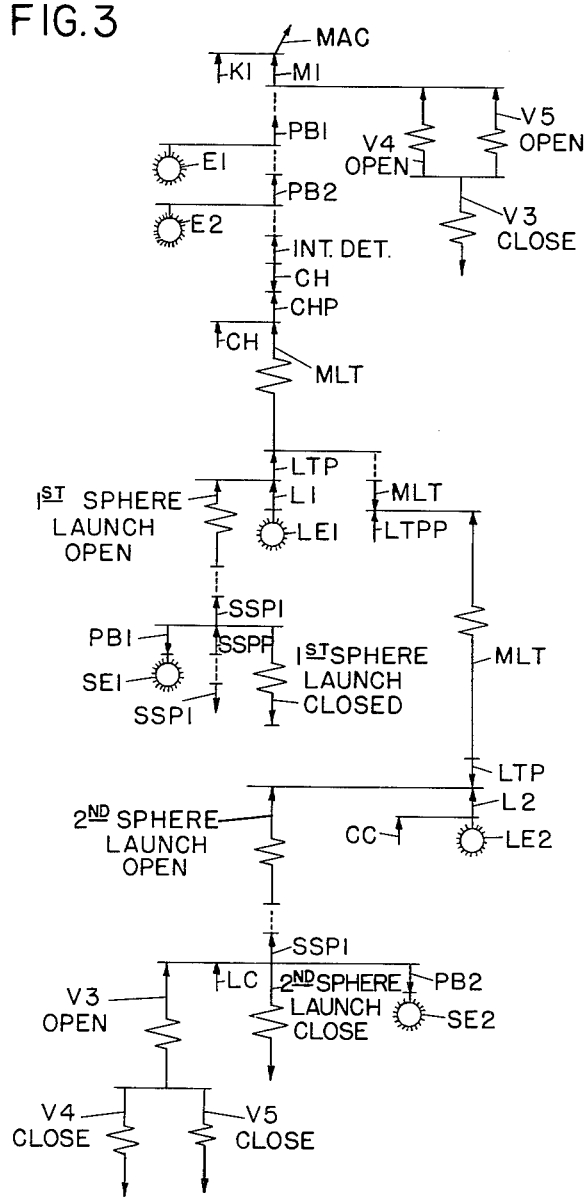

N. B. COLEY ETAL 3,199,527

SYSTEM FOR MARKING AND INDICATING THE PRESENCE
OF AN INTERFACE IN A PIPELINE

Filed Aug. 14, 1963

4 Sheets-Sheet 3

FIG.2B

INVENTORS
N.B.COLEY, S.M.PHELPS
AND F.A.DALY
BY
*Forest B. Hitchcock*
THEIR ATTORNEY

INVENTORS
N.B.COLEY, S.M.PHELPS
AND F.A.DALY
BY

THEIR ATTORNEY 3,199,527
SYSTEM FOR MARKING AND INDICATING THE PRESENCE OF AN INTERFACE IN A PIPELINE
Nelson B. Coley, Honeoye Falls, and Stuart M. Phelps and Frank A. Daly, Rochester, N.Y., assignors to General Signal Corporation, Rochester, N.Y., a corporation of New York
Filed Aug. 14, 1963, Ser. No. 302,068
6 Claims. (Cl. 137—268)

This invention relates to a method and system for marking and indicating the presence of an interface in a pipeline, and it more particularly pertains to the automatic launching of one or more markers, or spheres, in a pipeline in response to the detection of the arrival of an interface at a particular point in the line.

If there is no object inserted in a pipeline to mark an interface when there is a change in the product being transmitted, there is increased mixing of the two products at or near the interface as the interface progresses through an extended distance. This makes the problem of interface detection at a distant receiving station difficult, and there is also a substantial amount of fluid that must be specially handled because it is a mixture of the two products.

The system according to the present invention provides a method of more positive separation at an interface wherein an object is inserted in a pipeline at the interface at a point close to the point at which the product change takes place. The interface is first detected at one point in the pipeline by a conventional interface detector which may operate on a basis of detecting a change in the physical characteristics of the fluids transmitted through the pipeline, such as a change in viscosity, electrical or thermo-conductivity and the like. Responsive to such detection, an interval is timed for the arrival of the interface at a second point in the pipeline, such interval taking into account the rate of flow of the fluid in the pipeline. Upon termination of the selected interval, the interface is marked by the launching of a sphere at the second point in the pipeline to separate the two products and identify the point of product change. It is further provided that a plurality of spheres can be launched at intervals representative of predetermined quantities of fluid being disposed between the spheres in the pipeline.

An object of the present invention is to distinctly mark an interface in a pipeline by first detection an interface at one point in a pipeline and then launching an object in the pipeline at a second point at the end of a time interval which has been initiated by the detection of the interface at the first point.

Another object of the present invention is to launch a plurality of objects in a pipeline at time intervals determined by the rate of flow of fluid through the pipeline.

Another object of the present invention is to control the sequence of operation of valves in a pipeline to bypass an object launching pipeline section except when the launcher is being used.

Another object of the present invention is to sequence the operation of the valves in cutting in and cutting out the bypass section of the pipeline so that continuity of flow of fluid through the pipeline is maintained at all times.

Other objects, purposes and characteristic features of the present invention will be in part obvious from the accompanying drawings, and in part pointed out as the description of the invention progresses.

Describing the invention in detail, reference is made to the accompanying drawings wherein similar reference characters are used in the several figures to identify corresponding parts, and wherein:

Figure 1:
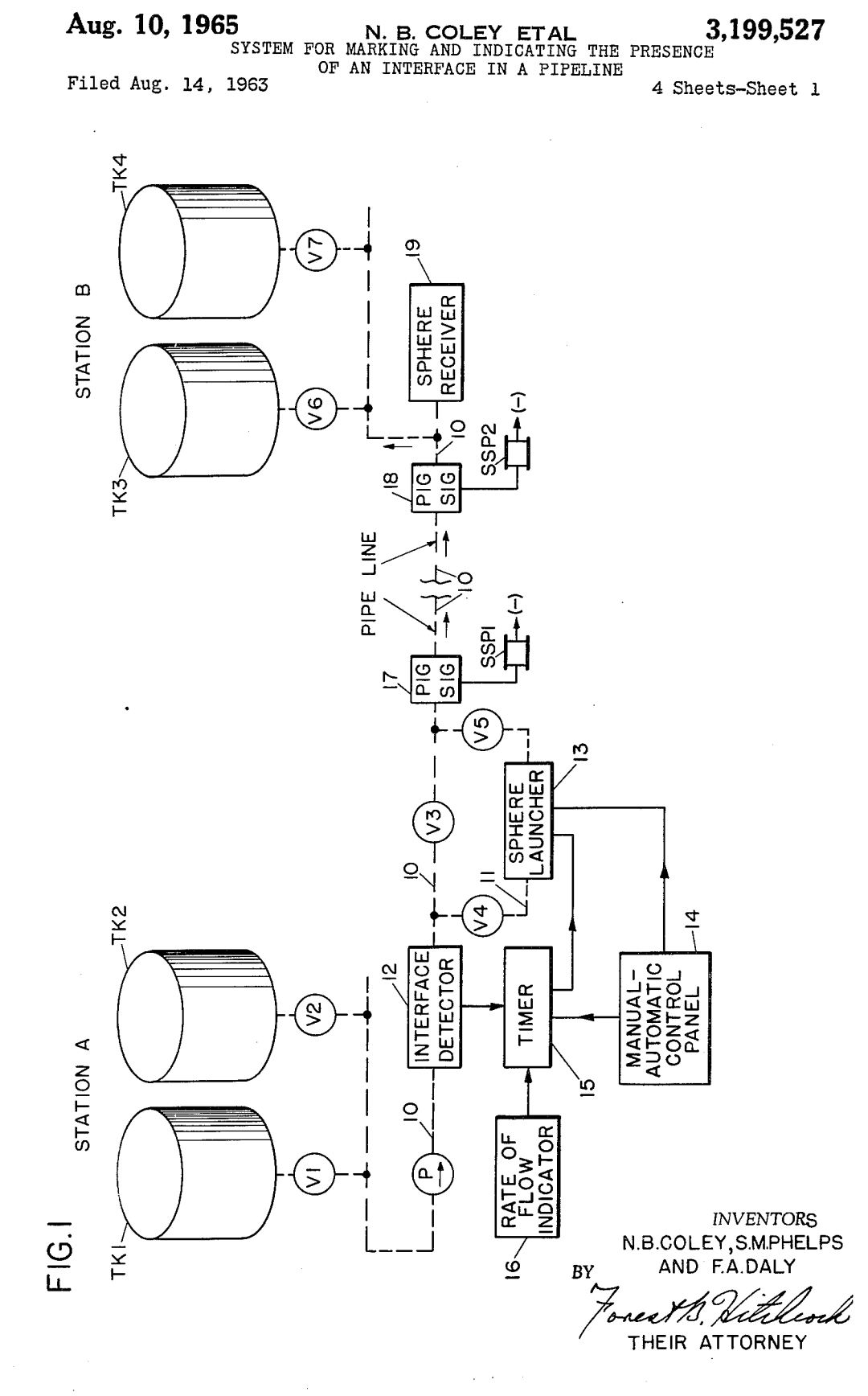

FIG. 1 illustrates, partly by block diagram, one embodiment of a pipeline system employing the present invention for marking and indicating the presence of an interface;

Figure 2A:
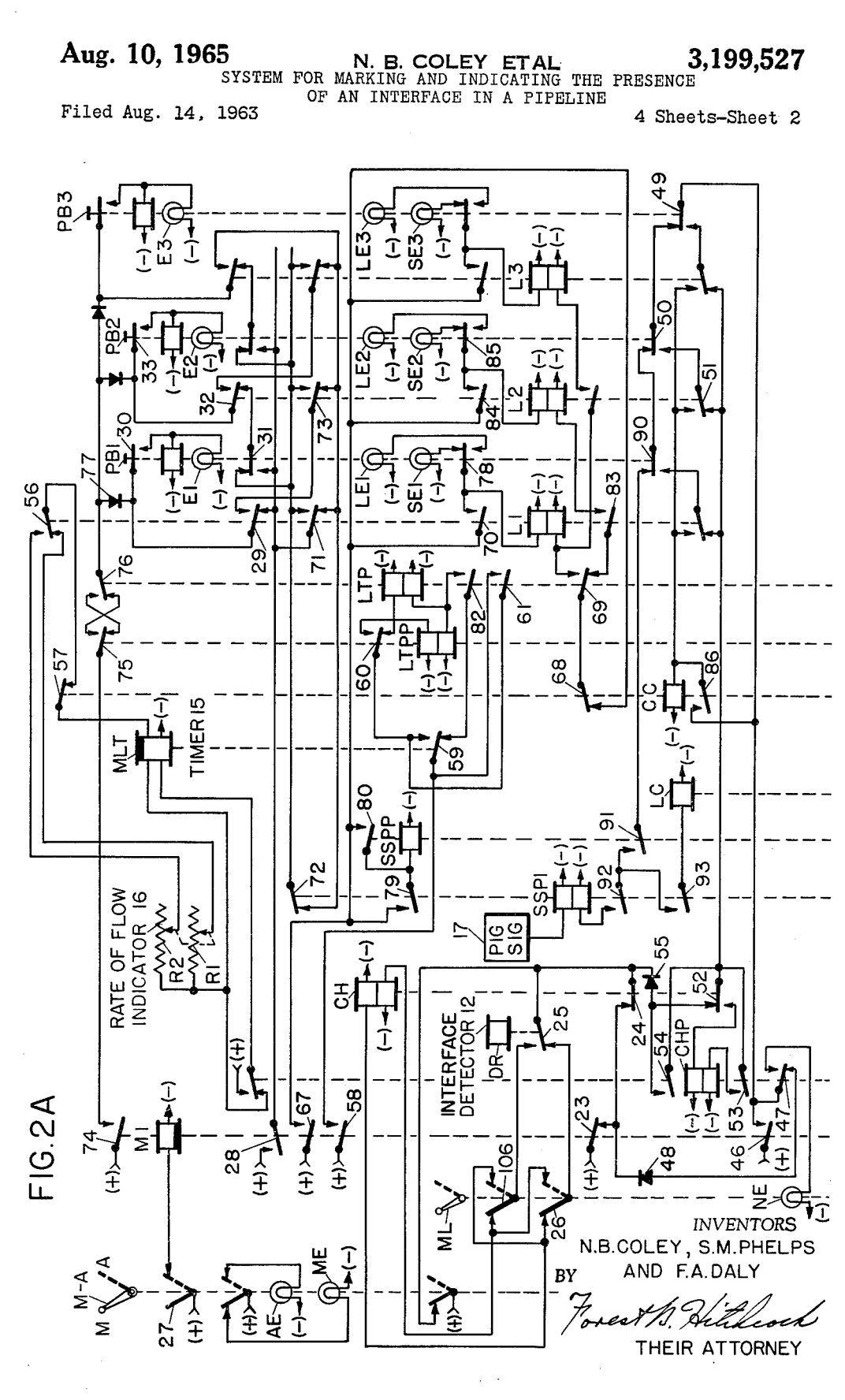

FIGS. 2A and 2B when placed one above the other illustrate a circuit organization for one embodiment of the present invention for the automatic launching of spheres in a pipeline in accordance with the detection of an interface; and FIG. 3 is a sequence chart illustrating the sequence of operation of various parts of the system under a typical operating condition.

With reference to FIG. 1, one embodiment of the present invention is illustrated wherein a pipeline system connects stations A and B. This system is for the transmission of fluid from station A to station B, tanks TK1 and TK2 at station A being provided for storing different products, which can be applied to a pipeline 10 selectively by the operation of valves V1 and V2. Similarly the tanks TK3 and TK4 at station B can be selectively filled from the pipeline 10 in accordance with the control of valves V6 and V7 connecting these tanks to the pipeline 10 respectively. A suitable pump P is provided at station A for pumping fluid through the pipeline 10 to station B, and valves V3 and V4 and V5 are provided at station A for selectively governing the bypass of fluid through a bypass pipe section 11 when a sphere is to be launched.

An Interface Detector 12 is provided at a first point in the pipeline 10 at station A, and a Sphere Launcher 13 is provided at a second point in the bypass portion 11 of the pipeline system. The launching of a sphere in the pipeline by the Sphere Launcher 13 is controlled by a Manual-Automatic Control Panel 14, together with a Timer 15. The Timer 15 has its timing determined by a suitable Rate Of Flow Indicator 16 which can be set manually or can be set in accordance with the measurement of the rate of flow of fluid in the pipeline 10. A Pig Sig 17 is provided in the pipeline 10 at station A for registering by the actuation of an associated relay SSP1 the passage of a sphere through the associated portion of the pipeline. Similarly, at station B, a Pig Sig 18 is provided for actuating an associated relay SSP2 when a sphere passes through that portion of the pipeline 10. A Sphere Receiver 19 is provided for receiving the spheres that are transmitted through the pipeline 10 to station B.

The Automatic-Manual Control Panel 14 of FIG. 1 contains control switches, push buttons, and indicator lamps. This control panel apparatus is shown in FIGS. 2A and 2B as including a manual-automatic two position selector switch M–A, a two position manual control switch ML, and push buttons PB1, PB2 and PB3 for designating the number of spheres to be launched. These push buttons are of the type having a holding winding which can hold these buttons in an actuated position as long as the associated winding is energized. Each of the launch buttons PB has associated therewith three indicating lamps, an indicating lamp E being provided for indicating the designation of the launching of a sphere, an indicator lamp LE being provided for indication when a sphere is about to be launched and an indicator lamp SE being provided for indicating that the sphere has been launched in the main pipeline 10. A fault indicator lamp FE (see FIG. 2B) is provided on the control panel for indicating to an operator an abnormal condition wherein a sphere fails to be launched within a particular predetermined time interval.

A Timer MLT (see FIG. 2A) is provided for timing the arrival of an interface at the Sphere Launcher 13 so that a first sphere 21 may be launched at the proper time. The timer MLT is also used for timing the interval between the launching of spheres where several spheres are launched in accordance with the marking of an interface. The Rate Of Flow Indicator 16 is provided for governing the time interval to be measured by the timer MLT in accordance with the rate of flow of fluid though the pipeline 10. The Rate Of Flow Indicator 16 is illustrated as having two variable resistors, the resistor R1 being used to determine the time interval for launching a first sphere, and the resistor R2 being used for determining the time interval between the launching of successive spheres. Although the Timer MLT is preferably of an electronic type because of having a relatively long time interval to measure, for the purpose of facilitating the disclosure of the present invention, the timer MLT has been illustrated as being comparable to a slow pick up relay, in that the timer MLT is actuated a predetermined time interval after it becomes energized, thus the closure of its front contacts as indicative of termination of its measured time interval. Other timers M1, M3 and M4 are provided for timing intervals used in the system, and these timers can be assumed as being comparable to slow drop away relays in that their timing starts upon their deenergization, and the expiration of their measured time intervals is indicated by the closure of their back contacts. The timers M1, M3 and M4 can be motor driven timers because of having to time a relatively long period.

The push buttons PB1, PB2 and PB3 have associated therewith respectively launch relays L1, L2 and L3. These relays become picked up when the launching of the first, second and third spheres respectively is initiated. Relays LTP and LTPP are provided for governing the sequential operation of the launch relay L1, L2 and L3, together with being used in the control of the Sphere Launcher 13.

With reference to FIG. 2A, the Pig Sig 17 has associated therewith a relay SSP1 which is normally deenergized, and is momentarily picked up in accordance with the momentary actuation of the Pig Sig 17 upon the passage of a sphere. A repeater relay SSPP is actuated in respose to the picking up of the relay SSP1 when the first sphere is launched, and the relay SSPP is maintained picked up throughout the launching of the following spheres.

Relays CH and CHP are provided for initiating the system into operation in response to the actuation of the Interface Detector 12. The Interface Detector 12 has a relay DR which is actuated to its opposite position in accordance with the detection of an interface at a first point in the pipeline 10.

A relay CC is provided for registering when the last sphere launching has been initiated in the series of launches, and a relay LC is provided for registering when the last of the series of spheres has been launched.

Each of the valves V3, V4 and V5, and the Sphere Launcher 13 is actuated by a motor driven "limitorque" valve operator which has open and close control wires O and C respectively, the energization of which is sufficient to insure operation of the associated valve of Sphere Launcher 13 to an open or closed position. The Sphere Launcher 13 includes a storage barrel 20 having a removable cap 20a for storing a plurality of spheres 21, and a motor driven gate 22 is provided for launching the spheres into the pipeline 10, the gate 22 being operable to insert only one sphere 21 for each operation.

Having thus considered the general organization of the system, more detailed consideration of the circuit organizations will be hereinafter considered upon consideration of the mode of operation under typical operating conditions.

*Operation*

The system is normally at rest, and the normal conditions of the apparatus is illustrated in FIGS. 2A and 2B, wherein all of the relays are normally deenergized except for the relay CH. Relay CH is a change detector relay which is used to start the launching sequence either by detecting the operation of the interface detector relay DR or by detecting the manipulation of the manual control switch ML when launching is to be initiated manually. The relay CH has its windings connected in opposition, and its circuit is so organized that the operation of the detector relay DR or the manual lever ML will transfer the energizing circuit for relay CH from one winding to the other, thereby causing the relay to be driven down. Relay CH is normally maintained energized by a circuit including back contact 23 of timer M1, front contact 24 of relay CH, back contact 25 of relay DR, contact 26 of lever M1 in its left hand position, and upper winding of relay CH. The manual-automatic control switch M–A is normally in its left hand position which selects manual control of the sphere launcher.

To set the system in condition for the automatic launching of spheres 21 in accordance with the detection of an interface by Interface Detector 12, an operator first moves the manual-automatic control switch M–A (see FIG. 2A) to the right hand position. This extinguishes an indicator lamp ME which is associated with the switch and illuminates the lamp AE to indicate the switch position. The operation of the lever M–A to the position A provides for the energization of the timer M1 by a circuit including contact 27 of switch M–A in its right hand position. The timer M1 does not start timing however, until the switch M–A is actuated to its left hand position following the completion of the launching of the spheres 21.

The operator then proceeds to designate the number of spheres 21 to be launched by the actuation of the push buttons PB1, PB2 and PB3, the actuation of each button being effective to designate the launching of one sphere 21. Assuming that the operator wishes to have two spheres launched, he actuates the push button PB1 and PB2 successively. The push button PB1 is held in its depressed position by the energization of its holding winding in a circuit including front contact 28 of timer M1, back contact 29 of relay L1, and contact 30 of push button PB1 in its depressed position. Similarly, the button PB2 is held in its depressed position by the energization of a circuit including front contact 28 of timer M1, contact 31 of push button PB1 in its depressed position, back contact 32 of relay L2, and contact 33 of push button PB2 in its depressed position.

The actuation of the lever M–A to its right hand position has also been effective to cause the picking up of the relay K (see FIG. 2B) to connect the automatic control circuits to the operating mechanism for the valves V3, V4 and V5 and to the Sphere Launcher 13. This relay is energized by a circuit including contact 34 of switch M–A in its right hand position and back contact 35 of relay CHP. The circuit for relay K includes circuit selections indicated by "XX" which provide an interlock with push-button valve control to means for the individual valves that is normally used just for maintenance purposes. Upon the picking up of relay K, the valves V4 and V5 have their open control wires O energized for opening these valves. The circuit for the energization of the open wire O of valve V4 includes front contact 36 of timer M1, back contact 37 of relay LC, and front contact 38 of relay K. The circuit for applying energy to the open wire O of valve V5 includes front contact 36 of timer M1, back contact 39 of relay LC and front contact 40 of relay K. After the valves V4 and V5 have been operated to their open positions, the contacts 41 and 42 of these valves respectively become closed, and in accordance therewith, a circuit is closed for applying energy to the close control wire C of valve V3 for the power operation of that valve to its closed position. This circuit includes front contact 36 of timer M1, back contact 43 of relay SSPP, front contact 41 of valve V4, front contact 42 of valve V5, and front contact 44 of relay K. The operation of valve V3 to its closed position opens contact 45 of that valve. The valves V3, V4 and V5 are thus conditioned by bypass the flow of fluid in the pipeline 10 through the bypass section 11, including the Sphere Launcher 13 so that the spheres 21 that are launched will be carried into the main portion of the pipeline 10.

No further operation of the system takes place until the arrival of an interface at the point of location of the Interface Detector 12 in the pipeline 10 (see FIG. 1). The actuation of the relay DR (see FIG. 2A) of the Interface Detector 12 in accordance with the detection of an interface, causes the dropping away of the relay CH by the energization of its lower winding with reverse polarity. The upper winding of relay CH has been energized since the energization of the timer M1 by a circuit including front contact 46 of timer M1, back contact 47 of relay CHP, diode 48, front contact 24 of relay CH, back contact 25 an Interface Detector 12 and contact 26 of switch ML in its left hand position. The picking up of the interface detector relay DR provides for the energization of the lower winding of relay CH by closing a circuit for that winding including front contact 46 of timer M1, back contact 47 of relay CHP, diode 48, front contact 24 of relay CH, front contact 25 of relay DR, and contact 106 of switch ML in its left hand position. The dropping away of relay CH opens the circuit just described at front contact 24.

The dropping away of relay CH causes the picking up of its repeater relay CHP in accordance with the energization of a circuit including front contact 46 of timer M1, front contact 49 of push button PB3, back contact 50 of push button PB2, back contact 51 of relay L2, and back contact 52 of relay CH. Upon the picking up of relay CHP, a stick circuit is closed by front contact 53 to effectively shunt back contact 52 out of the circuit just described. Relay CHP remains picked up until all of the designated number of spheres 21 have been launched. A circuit is closed to restore the relay CH to its normally energized position upon the picking up of relay CHP including front contact 46 of relay M1, front contact 49 of relay PB3, back contact 50 of push button PB2, back cotnact 51 of relay L2, front contact 54 of relay CHP, diode 55, front contact 25 of Interface Detector relay DR and contact 106 of the switch ML in its left hand position.

The picking up of relay CHP initiates the operation of the timer MLT. This timer is of a type that when energized will continue to cycle in the measurement of a time interval, the duration of the time interval being determined by the Rate Of Flow Indicator 16. The back contacts of the timer MLT remain closed until the end of the measured time interval, and then the front contacts are closed for a relatively short period of time before the timer MLT repeats its cycle of operation. The first time interval to be measured by the timer MLT is determined by the resistor R1, which is connected to the timer MLT through back contact 56 of relay L1 and back contact 57 of relay CC. As has been heretofore pointed out, the value of the resistor R1 is determined in accordance with the rate of flow, and thus the timer MLT is initially effective to time the period of flow of the interface from its point of detection by the Interface Detector 12 to a second point in the pipeline at which a first sphere 21 is to be launched.

At the end of the first time interval measured by the timer MLT, the relay LTP becomes picked up by the energization of a circuit including front contact 58 of timer M1, front contact 59 of timer MLT, back contact 60 of relay LTPP and upper winding of relay LTP. In response to the picking up of relay LTP, a circuit is closed for applying energy to the open control wire O (see FIG. 2B) of the Sphere Launcher 13 to move the first sphere 21 into the pipeline. Only one sphere 21 can be admitted to the pipeline for a single opening of the Sphere Launcher 13 because of the structure of the launcher including a gate 22 which will pass only a single sphere 21 for each opening of the launcher. The circuit for energization of the open control wire O of the Sphere Launcher 13 includes front contact 62 of timer M1, back contact 63 of relay SSP, back contact 64 of relay LTPP, front contact 65 of relay LTP and front contact 66 of relay K. The mechanism of the Sphere Launcher 13 is such as to permit complete operation to an open position even though the circuit just described may be opened before completion of the launching of the first sphere 21.

At the time the launching of the first sphere 21 is called for the relay L1 (see FIG. 2A) is picked up. The pick up circuit for this relay includes front contact 67 of timer M1, back contact 68 of relay LTPP, front contact 69 of relay LTP and lower winding of relay L1. The picking up of this relay establishes a stick circuit including front contact 67 of timer M1, front contact 70 of relay L1 and upper winding of relay L1. The push button PB1 is maintained in its actuated position by the energization of its winding after the relay L1 has been picked up and until there is an indication by actuation of the Pig Sig 17 to show that the first sphere has actually been launched. This is to provide proper control for indicator lamps associated with the launching of the first sphere 21. Thus, the winding of the push button PB1 is energized after the relay L1 has become picked up by the energization of a circuit including front contact 28 of timer M1, front contact 71 of relay L1, back contact 72 of relay SSP1, back contact 73 of relay L2, front contact 29 of relay L1 and contact 30 of push button PB1. The push button PB1 is maintained energized during the picking up of relay L1 to cover the crossover time of the contacts of that relay by a circuit including front contact 74 of timer M1, back contact 75 of relay LTPP, front contact 76 of relay LTP, diode 77 and contact 30 of push button PB1.

In accordance with the picking up of the relay L1 for the launching of the first sphere, the circuit is closed to energize the launch indicator lamp LE1. This circuit includes front contact 67 of timer M1, front contact 70 of relay L1, and contact 78 of push button PB1 in its depressed position.

After the first sphere 21 has been launched into the main pipeline 10, it actuates the Pig Sig 17 and thus momentarily picks up as the relay SSP1. The picking up of relay SSP1 opens the circuit for the energization of the winding of push button PB1 to permit this push button to be restored to its normal position. The shifting of contact 78 of push button PB1 under these conditions extinguishes the indicator lamp LE1 and energizes the indicator lamp SE1 to indicate that the first sphere 21 has actually been launched into the main portion of the pipeline 10 before the start of timing for launching a second sphere. The picking up of relay SSP1 also picks up its repeater relay SSPP in accordance with the energization of a circuit including front contact 67 of timer M1, and front contact 79 of relay SSP1. The picking up of this relay establishes a stick circuit at front contact 80 to shunt contact 79 out of the circuit just described for the relay SSPP, thus maintaining the relay SSPP energized throughout the remainder of the launching operations. The opening of back contact 43 of relay SSPP stops the closing of valve V3.

In accordance with the picking up of relay SSP1 as a result of detecting the passage of the first sphere 21 into the pipeline 10, a circuit becomes closed for energizing the closed control wire C of the Sphere Launcher 13 (see FIG. 2B) to condition the Sphere Launcher 13 for launching the second sphere 21. It is necessary for the gate 22 of the Sphere Launcher 13 to be restored to its normal position before a second sphere 21 can be positioned for launching. Thus, energy is applied to the control wire C of the Sphere Launcher 13 through front contact 62 of timer M1, front contact 63 of relay SSP1, and front contact 81 of relay K.

In timing the interval between the launching of the first sphere 21 and the launching of the second sphere 21, the timer MLT is governed by the variable resistor R2 of the Rate Of Flow Indicator 16 in accordance with the connection that is made to this resistor through front contact 56 of relay L1. This contact is closed upon the picking up of relay L1 for the launching of the first sphere 21. At the time when the measurement of this second time interval is initiated, the timer MLT closes back contact 59 and thus provides for the energization of the windings of both relays LTP and LTPP by a circuit including front contact 58 of timer M1, back contact 59 of timer MLT, and front contact 82 of relay LTP. At the end of the second time interval measured by the timer MLT, the relay LTP becomes dropped away by the opening of its stick circuit at back contact 59 of timer MLT, but the relay LTPP is maintained picked up by the energization of a stick circuit for this relay including front contact 58 of timer M1, front contact 59 of timer MLT, and front contact 60 of relay LTPP. Front contact 61 of relay LTP shunts contact 59 in the stick circuit for relay LTPP during the shifting of the position of contact 59.

The dropping away of relay LTP provides for the picking up of relay L2 in accordance with the start of the launching of the second sphere 21. The circuit for the energization of relay L2 includes front contact 67 of timer M1, back contact 68 of relay CC, back contact 69 of relay LTP, front contact 83 of relay L1, and lower winding of relay L2. This relay is maintained energized by a stick circuit including front contact 67 of timer M1, front contact 84 of relay L2 and upper winding of relay L2. This circuit also energizes the indicator lamp LE2 through contact 85 of push button PB2 in its depressed position to show that a second sphere 21 is about to be launched. Because only two spheres 21 have been assumed to be designated to be launched, the picking up relay L2 indicates the initiation of the last sphere 21. At this time, the relay CC becomes picked up by the energization of a circuit including front contact 46 of timer M1, contact 49 of push button PB3 in its normal position, contact 50 of push button PB2 in its actuated position, and front contact 51 of relay L2. The picking up of this relay closes a stick circuit at front contact 86 to maintain relay CC energized until the timer M1 opens its front contact after restoration of the switch M–A to its left hand position.

At the time of the dropping away of relay LTP at the end of the second measured time interval, energy is applied to the open wire O of the Sphere Launcher 13 for launching a sphere 21 by a circuit including front contact 62 of timer M1, back contact 63 of relay SSP1, front contact 64 of relay LTPP, back contact 65 of relay LTP, and front contact 66 of relay K. When the second sphere 21 becomes launched, and passes the Pig Sig 17 in the pipeline 10, the relay SSP1 becomes picked up, and the picking up of this relay closes a circuit to apply energy to the control wire C for closing the Sphere Launcher 13. The circuit for applying energy to the wire C of Sphere Launcher 13 includes front contact 62 of relay M1, front contact 63 of relay SSP1 and front contact 81 of relay K.

The opening of contact 72 of relay SSP1 in the circuit for the winding of the push button PB2 causes the restoration of the push button PB2 to its normal position, which shifts contact 85 so as to extinguish indicator lamp LE2 and to energize the indicator lamp SE2 which indicates that the second sphere 21 has passed the Pig Sig 17 in the pipeline 10.

The picking up of relay SSP1 after the launching of the last sphere 21, closes a circuit for the energization of the open control wire O of valve V3 to initiate the opening of this valve. This circuit includes front contact 36 of timer M1, front contact 43 of relay SSPP, front contact 87 of relay SSP1, front contact 88 of relay CC, and front contact 89 of relay K.

When relay SSP1 is picked up in the detection of the last of a series of spheres 21 to be launched, a stick circuit is closed to maintain this relay energized until the end of a timing interval which is timed by the timer M1, after the switch M–A is restored to its left hand position. This circuit includes front contact 46 of timer M1, normally closed contact 49 of push button PB3, normally closed contact 50 of push button PB2, normally closed contact 90 of push button PB1, front contact 91 of relay SSPP, and front contact 92 of relay SSP1. The relay LC is also picked up at this time by the energization of the same circuit through front contact 93 of relay SSP1. The picking up of relay LC opens the control circuits for the open control wires O of valves V4 and V5 at back contacts 37 and 39 respectively. The valve V4 becomes closed after the valve V3 has been actuated to its open position so as to close its normally closed contact 45. The circuit by which energy is applied to the closing control wire C of valve V4 includes front contact 36 of timer M1, front contact 43 of relay SSPP, front contact 87 of relay SSP1, front contact 88 of relay CC, front contact 89 of relay K, front contact 45 of valve V3, and front contact 94 of relay K. The circuit just described is also connected through front contact 59 of relay K to the control wire C for the closure of valve V5.

The system, having launched the designated number of spheres automatically in accordance with the detection of an interface by the Interface Detector 12, and after launching having closed the bypass valves which bypass fluid through the Sphere Launcher 13, is in condition for complete restoration to its normal condition. This is accomplished subsequent to actuation of the switch M–A (see FIG. 2A) to its left hand position. This actuation of the switch M–A deenergizes the timer M1 by opening its circuit at contact 27 of the switch M–A, and after the timer has completed its timing, it opens its front contact and closes its back contact to restore the system to its normal condition. The opening of its front contacts removes energy from all of the control circuits except the control circuit for the normally energized change relay CH. This relay is maintained energized by the closure of back contact 23 of the timer M1.

The timer M1 times only when it is deenergized, and the time interval is relatively long so as to permit time for the manual control of the Sphere Launcher 13 under certain conditions to be hereinafter considered before the restoration of the valves V3, V4 and V5 to normal conditions after the switch M–A is actuated from its automatic position to its manual position. If, for some reason, the valves V3, V4 and V5 have not been operated after a launching, the dropping away of the timer M1 at the end of its measured time interval provides for the opening of the valve V3 in the main line 10. This is accomplished by an obvious circuit closed at back contact 36 of timer M1.

Timers M3 and M4 are used to control a fault indicator lamp FE, and sound an alarm (not shown) if such alarm is considered desirable. The timer M4 starts to time when the relay CHP becomes picked up in response to the detection of an interface, and it continues to time until the relay SSPP becomes picked up to indicate that the first sphere 21 has been launched. If this launching takes place within a normal time interval, the timer M4 will not become dropped away during the launching, and thus it will not energize the circuit for the fault indicator lamp FE. The timer M3 is used to detect an abnormal time for the launching of all of the spheres 21, once the launching of the first sphere 21 is called for. Thus the timer M3 will not normally close its back contact during the launching interval so as to provide for the energization of the fault indicator lamp FE.

Both of the timers M3 and M4 become energized so as to open their contacts in response to the actuation of the control switch M–A to its right hand position as an initial operation in preparing the system for sphere launching. At this time, the timer M3 becomes energized by a circuit including contact 34 of switch M–A in its right hand position back contact 96 of relay SSPP, and back contact 97 of relay LTPP. This circuit becomes opened at back contact 97 of relay LTPP at the time the launching of the first sphere 21 is called for, and the back contact 96 of relay SSPP in the circuit for the timer M3 becomes opened when the first sphere 21 has passed into the pipeline 10. Timing of the timer M3 continues until the closure of front contact 98 of relay LC when all of the spheres 21 have been launched. The energizing circuit for the timer M4 includes contact 34 of switch M-A in its right hand position, and back contact 99 of relay CHP. Thus the timing is initiated by the opening of back contact 99 of relay CHP, and this timing continues until the closure of front contact 96 of relay SSPP.

The circuit for the energization of the fault indicator lamp FE can be closed upon expiration of the time measured by the timer M3 through front contact 100 of timer M1, and back contact 101 of timer M3. Similarly the lamp FE can be illuminated upon the expiration of the time measured by timer M4 upon the closure of a circuit including front contact 100 of timer M1 and back contact 102 of timer M4.

With reference to FIG. 2A, it will be noted that the contacts 26 and 106 of manual switch ML are connected in series with the Interface Detector relay DR contact 25 in a manner such that the actuation of the switch ML from one position to another shifts the energization of the relay CH from one winding to the other so as to actuate that relay to its dropped away position the same as has been described in detail for the actuation of relay CH in accordance with the detection of an interface. In other words, if the time of arrival of an interface is known, the actuation of the switch ML can be renedered effective as a means for registering the presence of the interface at a particular point in the pipeline 10 to start the system operating for timing the launching of the first sphere 21. This mode of operation could be used, for example, under conditions wherein the interface detector is not used or is inoperative.

The above mode of operation involving the use of the manual control switch ML is assuming that the control switch M-A has first been actuated to its right hand position for launching by the mode of operation that has been heretofore described. Another manner in which the manual control switch ML can be used in the control of a sphere launching is that if the manual control switch M-A is first operated to its right hand position so as to energize the timer M1 and then is restored to its left hand position, the operation of the switch ML can be used to control the Sphere Launcher 13 directly. Such mode of operation may be desirable to operate the Sphere Launcher 13 back and forth to attempt to free a sphere 21 that may be stuck in the barrel 20 and may have failed to be launched according to the automatic operation as has been heretofore described. The energization of the timer M1 is required in order to operate the valves V3, V4 and V5 and in order to apply energy for the picking up of the relay CHP in accordance with the dropping away of relay CH upon actuation of switch ML. It is also required that a push button such the push button PB1 be actuated so as to provide a pick up circuit for the relay CHP when the relay CH becomes dropped away.

With reference to FIG. 2B, the picking up of relay CHP closes its front contact 35 to provide for the energization of the relay K. The valves V4 and V5 are opened and the valve V3 is closed by the same mode of operation as has been heretofore described, and the Sphere Launcher 13 can be manually actuated by the control switch ML, which is actuated to its right hand position for the launching of a sphere 21 and is actuated to its left hand position for the closure of the Sphere Launcher 13. The launching of a sphere 21 is accomplished by the application of energy to the wire O of the Sphere Launcher 13 through contact 34 of switch M-A in its left hand position contact 103 of switch ML in its right hand position, back contact 104 of relay LC, and front contact 66 of relay K. If the switch ML is actuated to its left hand position, a circuit is closed for the energization of the wire C for closure of the Sphere Launcher 13 including contact 34 of switch M-A in its left hand position, contact 103 of switch ML in its left hand position, back contact 105 of relay LC, and front contact 81 of relay K. It should be readily apparent from the mode of operation that has been described, that the Sphere Launcher 13 can be actuated alternately to its open and closed positions at the will of an operator by his actuation of the switch ML until such time as the designated number of spheres 21 have been launched so as to cause the picking up of the relay LC and the dropping away of relay CHP.

Having thus described a system and method for marking and indicating the presence of an interface in a pipeline as one embodiment of the present invention, it is to be understood that various adaptations, alterations and modifications may be applied to the specific form shown to meet the requirements of practice, except as limited by the appending claims.

What we claim is:

1. A system for marking the presence of an interface in a fluid pipeline having a main valve in a main portion of the pipeline and a bypass portion of the pipeline extending around said main valve portion comprising:
    (a) launching means in said bypass portion for launching an object into said pipeline,
    (b) interface detecting means at a point in said main portion of the pipeline upstream relative to connection of the bypass portion for registering when an interface arrives at that point,
    (c) said launching means being rendered effective in response to the registration of an interface by said interface detecting means to launch said object into the pipeline,
    (d) object detecting means disposed in said pipeline downstream from said launching means for registering the presence of said object, and
    (e) means responsive to said object detecting means for opening said main valve.

2. A system for marking the presence of an interface in a fluid pipeline according to claim 1 wherein said launching means includes timing means initiated by the detection of an interface for rendering the launching of said object effective a predetermined time interval after the detection of an interface by said interface detecting means.

3. A system for marking the presence of an interface in a fluid pipeline according to claim 2 wherein said time interval is determined in accordance with the rate of flow of fluid through the pipeline.

4. A system for marking the presence of an interface in a fluid pipeline having a main line portion and a bypass portion around part of said main line portion comprising:
    (a) manually operable means for designating the launching of a plurality of objects into said pipeline,
    (b) interface detecting means in said pipeline for detecting the arrival of an interface at a predetermined point in the pipeline upstream relative to said bypass portion,
    (c) object launching means in said bypass portion responsive to the detection of an interface by said interface detecting means for launching said objects into said pipeline successively, and
    (d) indicating means for indicating the number of objects that have been designated to be launched by said manually operable means and for indicating when each object is being launched by said launching means.

5. A system for marking the presence of an interface in a pipeline according to claim 4 wherein indicating means is also provided for indicating when each of said predetermined number of objects have been launched into the pipeline respectively.

6. A system for marking the presence of an interface in a pipeline having a main line portion including a main valve and a bypass portion around said main valve and including at least one bypass valve in the bypass portion comprising:
 (a) manually operable means for designating the launching of a predetermined number of objects into the pipeline,
 (b) interface registration means for registering the arrival of an interface at a predetermined point upstream relative to said bypass portion,
 (c) launching means in said bypass portion for launching a plurality of objects into said pipeline successively,
 (d) valve control means responsive to said manually operable means for successively opening said bypass valve and closing said main valve,
 (e) normally inactive timing means initiated by the registration of the presence of an interface by said registration means for timing a series of time intervals,
 (f) said launching means being rendered effective in response to the termination of each of said time intervals by said timing means to launch an object into said pipeline,
 (g) indicating means in said pipeline downstream from said launching means for indicating the passage of each of said objects through the pipeline,
 (h) said valve control means being responsive to said indicating means to open said main line valve and close said bypass valve when all of said predetermined number of objects designated to be launched by said manually operable means have been launched, and
 (i) means for distinctively indicating the number of objects designated for launching and when said launching means is active to launch each object.

References Cited by the Examiner
UNITED STATES PATENTS 2,965,125  12/60  Osborne et al. _____ 137—268
3,135,278  6/64   Foord et al. _____ 137—15

M. CARY NELSON, *Primary Examiner.*

HENRY T. KLINKSIEK, *Examiner.*